US009046046B2

(12) United States Patent
Muta

(10) Patent No.: US 9,046,046 B2
(45) Date of Patent: Jun. 2, 2015

(54) VEHICLE CONTROLLER AND VEHICLE CONTROL METHOD

(75) Inventor: Koichiro Muta, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/699,011

(22) PCT Filed: Jun. 2, 2010

(86) PCT No.: PCT/JP2010/059345
§ 371 (c)(1), (2), (4) Date: Nov. 20, 2012

(87) PCT Pub. No.: WO2011/151900
PCT Pub. Date: Dec. 8, 2011

(65) Prior Publication Data

US 2013/0073133 A1 Mar. 21, 2013

(51) Int. Cl.
*B60W 20/00* (2006.01)
*F02D 29/02* (2006.01)

(52) U.S. Cl.
CPC .................................... *F02D 29/02* (2013.01)

(58) Field of Classification Search
CPC ..... B60W 10/06; B60W 20/00; B60W 10/08; B60W 10/115; B60W 10/184; B60W 2540/12; B60W 30/18118; B60W 2540/10; B60W 2510/0638; B60W 2520/10; B60K 2741/205; B60K 31/10; B60K 35/00; B60K 6/24; B60K 6/387; B60K 6/442; B60K 2350/1064; B60K 2741/045; B60K 2741/065; B60K 2741/245
USPC ............................ 701/22, 36, 48, 51, 70, 99
See application file for complete search history.

(56) References Cited

U.S. PATENT DOCUMENTS

| | | | | |
|---|---|---|---|---|
| 4,362,133 | A * | 12/1982 | Malik | 477/99 |
| 6,193,332 | B1 * | 2/2001 | Ono | 303/191 |
| 6,260,934 | B1 * | 7/2001 | Lee | 303/192 |
| 6,332,654 | B1 * | 12/2001 | Yano | 303/89 |
| 6,371,889 | B1 * | 4/2002 | Kuroda et al. | 477/181 |
| 6,504,259 | B1 * | 1/2003 | Kuroda et al. | 290/40 C |
| 6,826,469 | B2 * | 11/2004 | Iwata et al. | 701/93 |
| 7,140,697 | B2 * | 11/2006 | Koga et al. | 303/20 |
| 7,226,389 | B2 * | 6/2007 | Steen et al. | 477/195 |
| 7,601,093 | B2 * | 10/2009 | Tabata et al. | 477/5 |
| 7,681,961 | B2 * | 3/2010 | Nonaga et al. | 303/155 |
| 7,950,749 | B2 * | 5/2011 | Sakai | 303/142 |
| 8,366,211 | B2 * | 2/2013 | Suzuki | 303/191 |

(Continued)

FOREIGN PATENT DOCUMENTS

| | | |
|---|---|---|
| DE | 10 2007 008 930 | 10/2007 |
| JP | 8-244573 | 9/1996 |

(Continued)

*Primary Examiner* — John R Olszewski
*Assistant Examiner* — Truc M Do
(74) *Attorney, Agent, or Firm* — Finnegan, Henderson, Farabow, Garrett & Dunner, LLP

(57) ABSTRACT

A brake ECU executes a program including: the step of executing a first brake hydraulic pressure control for preventing decrease of brake hydraulic pressure regardless of decrease in an amount of operation of a brake pedal, if position is at a P position and the amount of operation of the brake pedal is determined to be decreasing; and the step of executing a normal, second hydraulic pressure control if the position is not the P position and the amount of operation of the brake pedal is not determined to be decreasing.

5 Claims, 6 Drawing Sheets

(56) References Cited

U.S. PATENT DOCUMENTS

| | | | | |
|---|---|---|---|---|
| 8,649,948 | B2 * | 2/2014 | Yanagida et al. | 701/51 |
| 2002/0033642 | A1 * | 3/2002 | Holl | 303/191 |
| 2003/0119628 | A1 * | 6/2003 | Jager et al. | 477/71 |
| 2003/0154014 | A1 * | 8/2003 | Iwata et al. | 701/93 |
| 2003/0184151 | A1 * | 10/2003 | Mueller et al. | 303/138 |
| 2004/0127327 | A1 * | 7/2004 | Kahlon et al. | 477/5 |
| 2005/0017580 | A1 * | 1/2005 | Cikanek et al. | 303/191 |
| 2005/0045134 | A1 * | 3/2005 | Amanuma et al. | 123/179.4 |
| 2006/0079377 | A1 * | 4/2006 | Steen et al. | 477/186 |
| 2006/0129299 | A1 * | 6/2006 | Schmidt | 701/71 |
| 2007/0007817 | A1 * | 1/2007 | Nonaga et al. | 303/155 |
| 2007/0114841 | A1 * | 5/2007 | Maruyama et al. | 303/89 |
| 2007/0173370 | A1 * | 7/2007 | Kanayama et al. | 477/3 |
| 2007/0179020 | A1 * | 8/2007 | Sokoll | 477/182 |
| 2007/0200424 | A1 * | 8/2007 | Sakai | 303/3 |
| 2008/0036294 | A1 * | 2/2008 | Yamamoto et al. | 303/116.1 |
| 2008/0076629 | A1 * | 3/2008 | Sugai et al. | 477/15 |
| 2008/0147286 | A1 * | 6/2008 | Goss et al. | 701/70 |
| 2008/0182710 | A1 * | 7/2008 | Shibata et al. | 477/3 |
| 2008/0185235 | A1 * | 8/2008 | Suzuki | 188/1.11 E |
| 2011/0065548 | A1 * | 3/2011 | Yu et al. | 477/203 |
| 2011/0136625 | A1 * | 6/2011 | Yu et al. | 477/185 |
| 2011/0308898 | A1 * | 12/2011 | Shiraki | 188/72.4 |
| 2012/0209479 | A1 * | 8/2012 | Yanagida et al. | 701/51 |
| 2013/0073133 | A1 * | 3/2013 | Muta | 701/22 |

FOREIGN PATENT DOCUMENTS

| | | |
|---|---|---|
| JP | 2000-313253 | 11/2000 |
| JP | 2005-153823 | 6/2005 |
| JP | 2006-82782 | 3/2006 |
| JP | 2007-230255 | 9/2007 |
| JP | 2009-274487 | 11/2009 |
| JP | 2010-014168 | 1/2010 |
| JP | 2010-089584 | 4/2010 |
| JP | 2010-111191 | 5/2010 |

* cited by examiner

VEHICLE CONTROLLER AND VEHICLE CONTROL METHOD

CROSS-REFERENCE TO RELATED APPLICATIONS

This application is a national phase application of International Application No. PCT/JP2010/059345, filed Jun. 2, 2010, the content of which is incorporated herein by reference.

TECHNICAL FIELD

The present invention relates to control of a vehicle mounting an internal combustion engine and an electric motor for starting operation of the internal combustion engine and, more specifically, to control of hydraulic pressure of a brake when the internal combustion engine is to be automatically started while the vehicle is parked.

BACKGROUND ART

For a vehicle having an internal combustion engine mounted thereon, a technique of automatically starting and stopping the internal combustion engine has been known. In such a vehicle, at the time of cranking to start the internal combustion engine, it is possible that power is transmitted to driving wheels to cause a feeling that the vehicle is lurching forward, or causing downward slip if on a sloping road.

In view of such a problem, Japanese Patent Laying-Open No. 2005-153823 (PTL 1) discloses a vehicle in which automatic stop of the internal combustion engine is facilitated and the feeling of lurching or moving downward on a sloping road is reduced at the time of automatic start. In the vehicle, if automatic stop conditions are satisfied, an internal combustion engine that is operating is automatically stopped, and if automatic start conditions are satisfied, the internal combustion engine that has been automatically stopped is automatically started, and the vehicle includes: a cylinder hydraulic pressure adjusting means allowing adjustment of cylinder hydraulic pressure of a brake wheel cylinder; brake pressure condition changing means for changing brake pressure condition as one of the automatic stop conditions based on the state of the cylinder hydraulic pressure adjusting means; and cylinder hydraulic pressure control means controlling the cylinder hydraulic pressure adjusting means such that the cylinder hydraulic pressure of the brake wheel cylinder is adjusted based on the state of cylinder hydraulic pressure adjusting means, when the automatic stop conditions including the brake pressure condition changed by the brake pressure changing means are satisfied and the internal combustion engine is automatically stopped.

According to the disclosure of the literature above, in the vehicle, the brake hydraulic pressure is increased to attain appropriate hydraulic pressure after automatic stop and, therefore, the feeling of lurching of the vehicle can be reduced at the time of automatic start.

Further, recently, as one measure to address environmental problems, hybrid vehicles running with the driving force from an internal combustion engine and a driving electric motor are attracting attention. In such a hybrid vehicle also, the internal combustion engine may be automatically started or stopped.

CITATION LIST

Patent Literature

PTL 1: Japanese Patent Laying-Open No. 2005-153823

SUMMARY OF INVENTION

Technical Problem

In certain types of hybrid vehicles, in order to reliably prevent movement of the vehicle while it is parked, the brake hydraulic pressure is increased every time control of automatic start and automatic stop of the internal combustion engine is executed.

If, however, increase/decrease of brake hydraulic pressure is repeated every time the internal combustion engine is automatically started or stopped, the number of operating a brake actuator for increasing/decreasing the brake hydraulic pressure increases. Therefore, a design for ensuring durability in view of the increased number of operations of the actuator becomes necessary, possibly leading to larger size and higher cost of the actuator. In the vehicle disclosed in the literature mentioned above, such a problem is not considered, and the above-described problem cannot be solved.

The present invention was made to solve the above-described problem and its object is to provide a vehicle controller and a vehicle control method that can prevent increase in the number of operations of the brake actuator when the internal combustion engine is automatically started and stopped.

Solution to Problem

According to an aspect, the present invention provides a vehicle controller mounted on a vehicle including an engine, a brake pedal, and a brake for limiting rotation of a wheel by supplying hydraulic pressure in accordance with an operation of the brake pedal. The vehicle controller includes: a detecting unit for detecting an amount of operation of the brake pedal; and a control unit performing control such that before the engine starts, if the shift position is at a parking position and decrease in an amount of operation of the brake pedal is detected, decrease of hydraulic pressure supplied to the brake is prevented until the shift position is switched.

Preferably, the vehicle controller further includes an engine control unit for automatically starting the engine if prescribed engine start conditions are satisfied based on a state of the vehicle.

More preferably, the control unit cancels prevention of decrease of hydraulic pressure supplied to the brake, if an operation is done to switch the shift position from the parking position to a shift position different from the parking position.

More preferably, the vehicle further includes a first rotating electrical machine for starting the engine and a second rotating electrical machine for generating driving force of the wheel. The engine, the first rotating electrical machine and the second rotating electrical machine are coupled through a planetary gear mechanism including a sun gear, a carrier and a ring gear. The vehicle controller further includes a rotating electrical machine control unit for controlling the second rotating electrical machine such that when the engine is to be started by using the first rotating electrical machine, a reaction force for transmitting a rotation force of the first rotating electrical machine to the engine is generated.

According to another aspect, the present invention provides a vehicle control method, for controlling a vehicle including an engine, a brake pedal, and a brake for limiting rotation of a wheel by supplying hydraulic pressure in accordance with an operation of the brake pedal. The vehicle control method includes the steps of: detecting an amount of operation of the brake pedal; and performing control such that before the engine starts, if the shift position is at a parking position and decrease in an amount of operation of the brake pedal is detected, decrease of hydraulic pressure supplied to the brake is prevented until the shift position is switched.

Advantageous Effects of Invention

According to the present invention, before the start of engine operation, if the shift position is at the parking position and decrease in the amount of operation of the brake pedal is detected, the hydraulic pressure to the brake is maintained until the shift position is switched from the parking position to a position different from the parking position. Therefore, it becomes possible to reduce increase of the number of operating brake actuator when the engine is automatically started or stopped while the vehicle is parked, while generation of gear noise of a plurality of gears (such as a parking lock gear of a parking lock mechanism) included in the power transmission mechanism between the engine and the driving wheel is reduced when the engine is automatically started or stopped. Therefore, a vehicle controller and a vehicle control method that can prevent increase of the number of operations of actuator when the internal combustion engine is automatically started or stopped can be provided.

DESCRIPTION OF EMBODIMENTS

Figure 1:
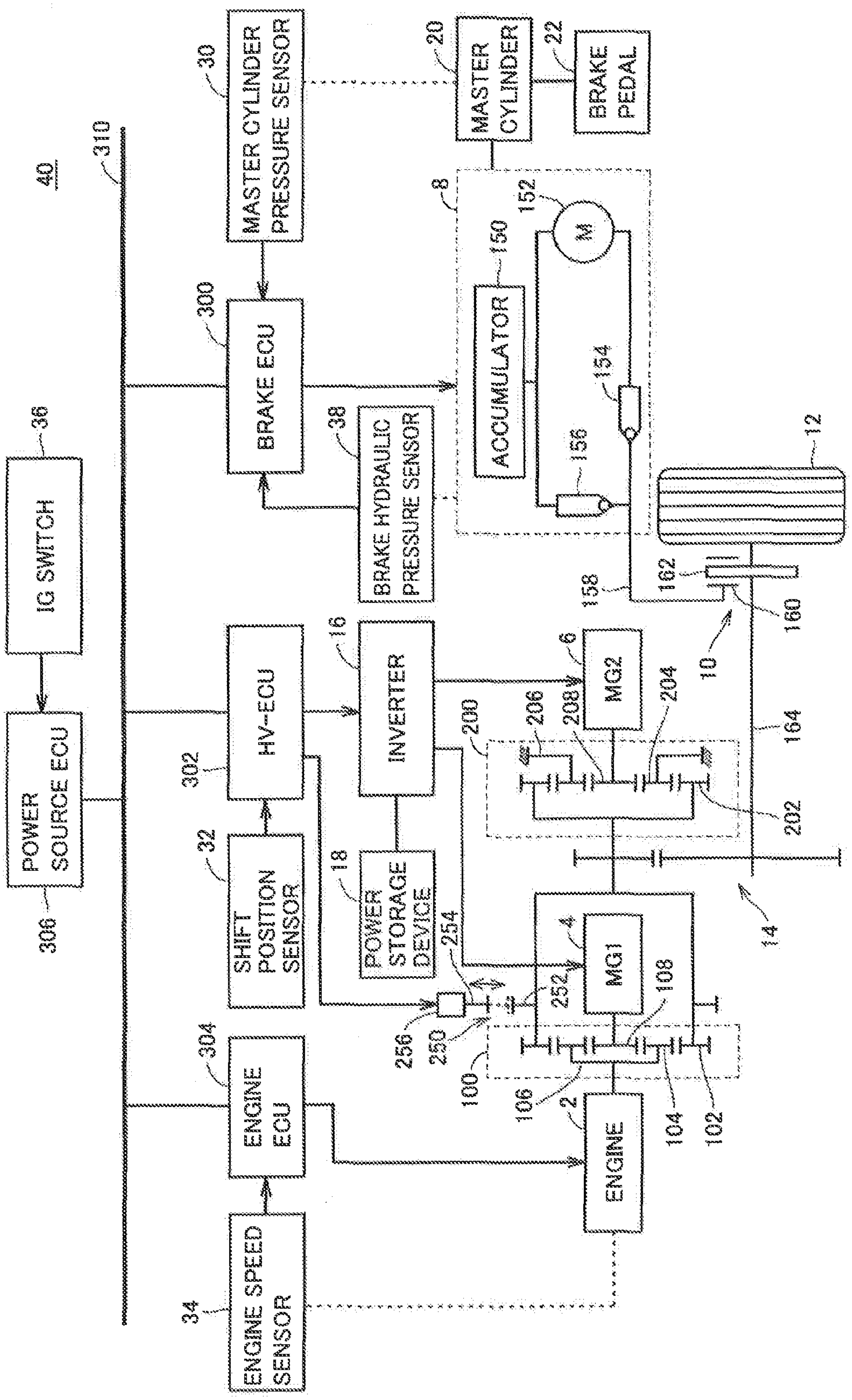
FIG. 1 shows an overall configuration of a hybrid vehicle in accordance with an embodiment of the present invention.

In the following, an embodiment of the present invention will be described with reference to the figures. In the following description, the same components are denoted by the same reference characters. Their names and functions are also the same. Therefore, detailed description thereof will not be repeated.

As shown in FIG. 1, a vehicle 40 includes an engine 2, a first motor generator (hereinafter denoted as first MG) 4 for power generation and starting, a second motor generator (hereinafter denoted as second MG) 6 for driving, a brake actuator 8, a brake 10, a driving wheel 12, a reduction gear 14, an inverter 16, a power storage device 18, a master cylinder 20, a brake pedal 22, a master cylinder pressure sensor 30, a shift position sensor 32, an engine speed sensor 34, an IG switch 36, a brake hydraulic pressure sensor 38, a power split device 100, a transmission 200, a brake ECU 300, an HV-ECU 302, an engine ECU 304 and a power source ECU 306.

In the present embodiment, vehicle 40 is a hybrid vehicle having at least engine 2 and second MG6 for driving mounted thereon, in which each of engine 2 and second MG 6 for driving is directly coupled to driving wheel 12. Vehicle 40 is not specifically limited to a hybrid vehicle, and it may be any vehicle having an engine coupled to driving wheel 12 through the power transmitting mechanism.

Engine 2 is a known internal combustion engine burning fuel and outputting power such as a gasoline engine or a diesel engine, and it is configured to allow electric control of its state of operation including throttle opening position (amount of intake air), amount of fuel supply and ignition timing. Such control is realized by engine ECU (Electronic Control unit) 304 mainly formed of a micro-computer.

Each of the first MG4 and the second MG 6 is a three-phase AC rotating electrical machine and has a function of an electric motor (motor) and a function of a power generator (generator).

The first MG 4 and the second MG 6 are connected through inverter 16 to power storage device 18 such as a battery or a capacitor. HV-ECU 302 controls inverter 16 and thereby controls output torque Ta of first MG 4 when operation of engine 2 is started and when power is generated using engine 2 as a power source. Further, HV-ECU 302 controls inverter 16 and thereby controls output torque Tb of second MG 6 when vehicle 40 is in a power-running state or at the time of regenerative braking.

Power split device 100 is a planetary gear provided between engine 2 and first MG 4. Power split device 100 splits the power input from engine 2 to power to the first MG 4 and power to reduction gear 14, which is coupled through drive shaft 164 to driving wheel 12.

Power split device 100 includes a first ring gear 102, a first pinion gear 104, a first carrier 106, and a first sun gear 108. The first sun gear 108 is an external gear coupled to an output shaft of first MG 4. The first ring gear is an internal gear arranged concentrically with first sun gear 108, and coupled to reduction gear 14. The first pinion gear 104 meshes with first ring gear 102 and first sun gear 108. First carrier 106 holds the first pinion gear 104 to allow rotation and revolution, and is coupled to an output shaft of engine 2.

Specifically, first carrier 106 is an input element, second sun gear 108 is a reaction element, and second ring gear 102 is an output element.

While engine 2 is in operation, with respect to the torque output from engine 2 input to first carrier 106, if reaction torque by first MG 4 is input to first sun gear 108, a torque having the magnitude resulting from summation/subtraction of the torques appears at the first ring gear 102 as the output element. In that case, the rotor of first MG 4 rotates by the torque and thus, first MG 4 functions as a generator. Further, if the number of rotations (output speed) of first ring gear 102 is made constant, the speed of engine 2 can be changed continuously (in non-step manner) by increasing/decreasing the speed of first MG. Specifically, control for setting the speed of engine 2 to realize the best fuel efficiency becomes possible by controlling the first MG 4. Such a control is done by HV-ECU 302.

If engine 2 is stopped while vehicle 40 is running, first MG 4 is rotating in the reverse direction. From this state, if first MG 4 is caused to function as the electric motor to output torque in the positive rotation direction, a torque acts to rotate engine 2, which is coupled to first carrier 106, in the positive direction, so that it is possible to start operation (motoring or cranking) of engine 2 by first MG 4. In that case, a torque in a direction of stopping the rotation acts on reduction gear 14. Therefore, the driving torque for running the vehicle can be maintained by controlling the torque output from second MG 6 and, at the same time, smooth starting of engine 2 is possible. This type of hybrid configuration is referred to as mechanical distribution type or split type hybrid.

Transmission 200 is a planetary gear provided between reduction gear 14 and second MG 6. Transmission 200 changes the speed of rotation of second MG6 and transmits the rotation to reduction gear 14. It is noted that transmission 200 may be omitted and the output shaft of second MG 6 may be directly coupled to reduction gear 14.

Transmission 200 includes a second ring gear 202, a second pinion gear 204, second carrier 206, and a second sun gear 208. Second sun gear 208 is an external gear coupled to an output shaft of second MG 6. Second ring gear 202 is an internal gear arranged concentrically with second sun gear 208, and coupled to reduction gear 14. Second pinion gear 204 meshes with second ring gear 202 and second sun gear 208. Second carrier 206 holds second pinion gear 204 to allow rotation and revolution, and it is fixed not to rotate.

Transmission 200 may change the speed of rotation of second MG 6 in one step or in a plurality of steps and transmit to reduction gear 14, by limiting the rotation or by establishing synchronized rotation of each element of the planetary gear in accordance with a control signal from HV-ECU 302, using a friction engagement element.

Between first ring gear 102 and reduction gear 104 of power split device 100, a parking lock mechanism 250 for limiting rotation of driving wheel 12 is provided. Parking lock mechanism 250 is operated by parking lock actuator 256. If a driver operates a switch (not shown) for selecting a parking position (hereinafter referred to as P position) and the P position is selected, HV-ECU 302 controls parking lock actuator 256 such that rotation of driving wheel 12 is limited by parking lock mechanism 250. Further, if the driver operates a shift lever (not shown) and selects a shift position different from the P position, HV-ECU 302 controls parking lock actuator 256 to cancel limitation of rotation by parking lock mechanism 250.

Parking lock mechanism 250 includes a parking lock gear 252 and a parking lock pole 254. Parking lock gear 252 rotates integrally with first ring gear 102 and second ring gear 202. Parking lock pole 254 has a projection that can engage with the teeth of parking lock gear 252.

Though parking lock mechanism 250 is described to be operated by parking lock actuator 256, it may be operated, for example, linked with a shift lever.

Parking lock actuator 256 moves parking lock pole 254 between the position indicated by a solid line and a position indicated by a broken line, of FIG. 1, in accordance with a control signal from HV-ECU 302.

When parking lock pole 254 moves to the position indicated by the broken line in FIG. 1 and the projection of parking lock pole 254 engages with the teeth of parking lock gear 252, rotation of parking lock gear 252 is limited. Since the rotation of parking lock gear 252 is limited, rotation of driving wheel 12 coupled through reduction gear 14 is limited.

When parking lock pole 254 moves to the position indicated by the solid line in FIG. 1 and the projection of parking lock pole 254 is separated from the teeth of parking lock gear 252, rotation limitation of parking lock gear 252 is cancelled. As the limitation of rotation of parking lock gear 252 is cancelled, rotation limitation of driving wheel 12 is cancelled.

A shift position sensor 32 is connected to HV-ECU 302. Shift position sensor 32 detects the currently selected shift position. Shift position sensor 32 transmits a signal indicating the shift position selected by the driver from among a plurality of shift positions, to HV-ECU 302.

The plurality of shift positions include, for example, the P position, a drive (forward running) position (hereinafter denoted as D position), a reverse (reverse running) position, a neutral position, and an engine brake position generating engine-braking force on the vehicle.

If, for example, the driver operates the shift lever or a switch to select the P position and thereby the P position is selected, shift position sensor 32 may transmit a signal indicating the P position to HV-ECU 302.

In the present embodiment, it is assumed that the P position can be selected while brake pedal 22 is pressed. By way of example, a mechanical mechanism that allows selection of P position while brake pedal 22 is pressed and prevents selection of P position while brake pedal 22 is not pressed, may be provided in vehicle 40. Alternatively, if a shift-by-wire system in which the HV-ECU 302 operates an electric actuator automatically or in accordance with a driver's instruction and thereby switches the shift position is provided in vehicle 40, HV-ECU 302 may reject selection of P position when brake pedal 22 is not pressed and may allow selection of P position when brake pedal 22 is pressed.

If P position is selected as the shift position, HV-ECU 302 transmits a shift position signal indicating that P position is selected, to brake ECU 300.

An IG switch 36 is connected to a power source ECU 306. If the driver operates IG switch 36 to start the system of vehicle 40 (hereinafter also referred to as an ST operation), power source ECU 306 turns on an IG relay (or the IG relay and an ACC relay), not shown, provided that brake pedal 22 is pressed. When an ST operation is done on IG switch 36, power source ECU 306 transmits a signal indicating that the ST operation is done, through a communication bus 310 to HV-ECU 302.

If a signal indicating that the amount of operation of brake pedal 22 is of a predetermined value or larger is received from brake ECU 304, power source ECU 306 determines that the condition that the brake pedal 22 is pressed is satisfied.

To engine ECU 304, an engine speed sensor 34 is connected. Engine speed sensor 34 detects the speed of rotation of engine 2 and transmits a signal indicating the detected speed of rotation of engine 2 to engine ECU 304.

To brake ECU 300, a master cylinder pressure sensor 30 and a brake hydraulic pressure sensor 38 are connected. Master cylinder pressure sensor 30 detects the master cylinder pressure that changes in accordance with the amount of operation of brake pedal 22 and transmits a signal indicating the detected master cylinder pressure to brake ECU 300. Brake ECU 300 calculates the amount of operation of brake pedal 22 based on the master cylinder pressure received from master cylinder pressure sensor 30.

In place of master cylinder pressure sensor 30, a stroke sensor that directly detects the amount of operation of brake pedal 22 may be used. If the calculated amount of operation of brake pedal 22 is of a predetermined value or larger, brake ECU 300 transmits a signal indicating that the amount of operation of brake pedal 22 is of a predetermined value or larger to power source ECU 306.

Brake hydraulic pressure sensor 38 detects brake hydraulic pressure Pb supplied from brake actuator 8 to brake 10 and transmits a signal indicating the detected brake hydraulic pressure Pb to brake ECU 300.

Brake pedal 22 to be operated by the driver is coupled to master cylinder 20. Master cylinder 20 supplies the hydraulic pressure generated in accordance with the amount of operation of brake pedal 22 by the driver to brake actuator 8.

Brake actuator 8 includes an accumulator 150, a pump motor 152, a pressure intensifying valve 156, and a pressure reducing valve 154. Brake actuator 8 supplies hydraulic pressure generated in master cylinder 20 in accordance with the amount of operation of brake pedal 22 by the driver directly to brake 10, or supplies hydraulic pressure in accordance with the state of vehicle 40 in addition to the hydraulic pressure in accordance with the amount of operation of brake pedal 22 by the driver or regardless of the amount of operation of brake pedal 22, to brake 10, in accordance with a control signal from brake ECU 300.

Pump motor 152 operates in accordance with a control signal from brake ECU 306. By the operation of pump motor 152, hydraulic pressure is accumulated in accumulator 150. Each of pressure reducing valve 154 and pressure intensifying valve. 156 is operated to open or close in accordance with a control signal from brake ECU 306. When pressure reducing valve 154 is opened, the hydraulic pressure supplied to brake 10 is discharged through pressure reducing valve 154. Therefore, the hydraulic pressure (brake pressure) of brake 10 reduces.

On the other hand, when pressure intensifying valve 156 is opened, hydraulic pressure accumulated in accumulator 150 is supplied through pressure intensifying valve to brake 10. Further, when pressure reducing valve 154 and pressure intensifying valve 156 are both closed, the hydraulic pressure supplied to brake 10 is maintained. When the driver presses brake pedal 22 while traveling on vehicle 40, if a slip of driving wheel 12 is detected, brake ECU 300 controls the state of opening/closing of each of pressure reducing valve 154 and pressure intensifying valve 156 so as to prevent locking of driving wheel 12.

Brake 10 includes a brake caliper 160 and a brake disk 162 having a circular plate shape. Brake disk 162 is fixed on drive shaft 164 with their rotation axes aligned. Brake caliper 160 includes a wheel cylinder and a brake pad, not shown. By hydraulic pressure supplied from brake actuator 8 to brake caliper 160, the wheel cylinder operates. The wheel cylinder thus operated presses the brake pad against brake disk 162, so that rotation of brake disk 162 is limited.

Brake ECU 300, HV-ECU 302, engine ECU 304 and power source ECU 306 are connected to be communicable to each other through a communication bus 310.

In the present embodiment, brake ECU 300, HV-ECU 302, engine ECU 304 and power source ECU 306 are described as separate ECUs. At least two of the plurality of ECUs may be integrated to one ECU.

In such a vehicle, after activation of the system of vehicle 40, while vehicle 40 is parked and engine 2 is stopped, HV-ECU 302 executes automatic start control of engine 2 if start conditions related to the state of vehicle 40 are satisfied. The start conditions related to the state of vehicle 40 may include a condition that warm-up of engine 2 is not yet completed.

By way of example, if cooling water temperature of engine 2 transmitted from engine ECU 304 is lower than a predetermined value, HV-ECU 302 determines that warm-up of engine 2 is not yet completed, and if the cooling water temperature of engine 2 is equal to or higher than a predetermined value, it determines that warm-up of engine 2 is completed. The cooling water temperature is detected, for example, by using a water temperature sensor (not shown) provided on engine 2.

The start conditions of engine 2 may include a condition that SOC (State Of Charge) representing remaining capacity of power storage device 18 is at a predetermined value or lower.

HV-ECU 302 estimates SOC based on the temperature, current and voltage of power storage device 18 transmitted from various sensors (not shown) provided on power storage device 18.

When HV-ECU 302 executes the automatic start control while vehicle 40 is parked, it controls the second MG 6 such that a torque in the positive rotation direction of second MG 6 is output.

This is to reduce backlash between each of the gears to prevent generation of gear noise at the plurality of gears included in the power transmission mechanism coupling second MG 6, transmission 200 and power split device 100 at the start of engine 2, and to generate reaction force against the rotation force in the positive rotation direction of first MG 4, through transmission 200 and power split device 100.

In the present embodiment, the plurality of gears included in the power transmission mechanism are gears included in power split device 100, reduction gear 14, parking lock mechanism 250 and transmission 200.

HV-ECU 302 controls the first MG 4 such that first MG 4 functions as a starter and a torque in the positive rotation direction is output, in addition to the output of torque in the positive rotation direction of second MG 6. Further, in addition to the operation of first MG 4, HV-ECU 302 causes engine ECU 304 to execute ignition control and fuel injection control.

Thus, the torque in a direction to cause positive rotation of engine 2 coupled to first carrier 106 acts on engine 2, so that engine 2 can be started by first MG 4.

While vehicle 40 is parked and engine 2 has already been started, HV-ECU 302 executes automatic stop control of engine 2 if stop conditions related to the state of vehicle 40 are satisfied. The stop conditions related to the state of vehicle 40 may include a condition that warm-up of engine 2 is completed, or a condition that the SOC of power storage device 18 is larger than the predetermined value.

When HV-ECU 302 executes the automatic stop control while vehicle 40 is parked, it controls the second MG 6 such that a torque in the reverse rotation direction of second MG 6 is output.

This is to reduce backlash between each of the gears to prevent generation of gear noise at the plurality of gears included in the power transmission mechanism coupling second MG 6, transmission 200 and power split device 100 when engine 2 is stopped, and to generate reaction force against the rotation force in the reverse rotation direction of first MG 4, through transmission 200 and power split device 100.

HV-ECU 302 controls the first MG 4 such that a torque in the reverse rotation direction of first MG 4 is output, in addition to the output of torque in the reverse rotation direction of second MG 6.

Thus, the torque in a direction to cause reverse rotation of engine 2 coupled to first carrier 106 acts on engine 2, so that rotation of engine 2 can be stopped by first MG 4. Further, in addition to the operation of first MG 4, HV-ECU 304 causes engine ECU 304 to stop ignition control and fuel injection control, whereby engine 2 is stopped.

It is noted, however, that reaction force generated by second MG 6 may vary and, therefore, it is desirable to increase the brake hydraulic pressure to prevent generation of gear noise resulting from the variation of reaction force of the second MG 6.

Figure 2:
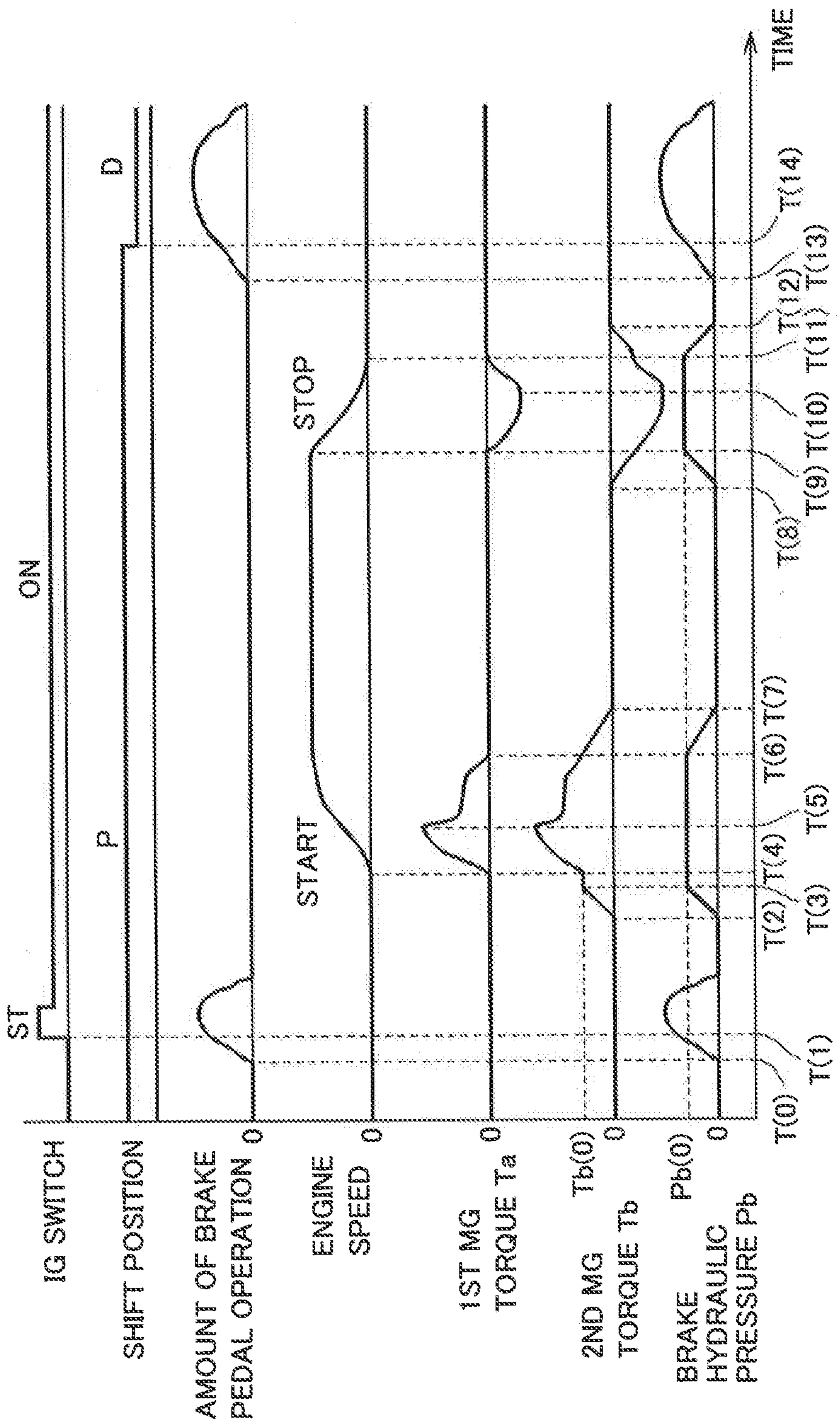
FIG. 2 is a timing chart representing change in brake hydraulic pressure when the brake actuator is operated every time the internal combustion engine is automatically started or stopped.

Referring to FIG. 2, an example of change in the brake hydraulic pressure when engine 2 is started while vehicle 40 is parked will be described. FIG. 2 shows changes in the amount of operation of brake pedal 22, the engine speed, an output torque Ta of first MG 4, an output torque Tb of second MG 6, and brake hydraulic pressure Pb. It is assumed that the system of vehicle 40 is stopped and the P position is selected as the shift position.

At time T(0), the driver starts pressing brake pedal 22 to activate the system of vehicle 40, and at time T(1) after the amount of operation of brake pedal 22 reached a predetermined value, the driver carries out the ST operation of IG switch 36, whereby power source ECU 306 turns on the IG relay. Thus, power is supplied to electric equipment mounted on vehicle 40 and the system in vehicle 40 is activated.

At time T(2), if the cooling water temperature of engine 2 is lower than the predetermined value and it is determined that warm-up is not yet completed, HV-ECU 302 causes brake ECU 300 to control brake actuator 8 such that brake hydraulic pressure Pb increases to a predetermined hydraulic pressure Pb(0), and controls second MG 6 such that output torque Tb of second MG 6 increases in the positive rotation direction from zero to attain a predetermined torque Tb(0).

At time T(3), HV-ECU 302 causes brake ECU 300 to control brake actuator 8 such that after the brake hydraulic pressure Pb reaches the predetermined hydraulic pressure Pb(0), the brake hydraulic pressure Pb is maintained at the predetermined hydraulic pressure Pb(0). Further, HV-ECU 302 controls second MG 6 such that the output torque Tb of second MG 6 increases to reach the predetermined torque Tb(0) in the positive rotation direction and thereafter, the output torque Tb of second MG 6 is maintained at the predetermined torque Tb(0). The predetermined torque Tb(0) is a torque that can prevent generation of gear noise and generate reaction force to transmit the rotation force of first MG 4 to engine 2 at the start of engine 2, and its value is determined in accordance with the specification of vehicle 40 and adjusted through experiments and the like.

At time T(4), HV-ECU 302 increases the output torque Ta of first MG 4 from zero in the positive rotation direction, and increases the output torque Tb of second MG 6 in the positive rotation direction, whereby the output torque Ta of first MG 4 is transmitted to the output shaft of engine 2. As the output torque Ta of first MG 4 is transmitted to the output shaft of engine 2, the output shaft of engine 2 starts rotation. In addition to the operation of first MG 4, HV-ECU 302 causes engine ECU 304 to execute ignition control and fuel injection control of engine 2, whereby engine 2 is started.

At time T(5), after it is determined that the speed of engine 2 has reached a predetermined speed or higher and hence engine 2 is started, HV-ECU 302 controls first MG 4 and second MG 6 such that the output torques Ta and Tb of first MG 4 and second MG 6 decrease to zero.

At time T(6), HV-ECU 302 controls first MG 4 such that the output torque Ta of first MG 4 is kept at zero. Further, HV-ECU 302 controls second MG 6 such that the output torque Tb of second MG 6 decreases to zero, and causes brake ECU 300 to control brake actuator 8 such that brake hydraulic pressure Pb decreases by a predetermined amount of change from the predetermined hydraulic pressure Pb(0) to zero.

At time T(7), HV-ECU 302 controls second MG 6 such that the output torque Tb of second MG 6 is maintained at zero. Further, HV-ECU 302 causes brake ECU 300 to control brake actuator 8 such that brake hydraulic pressure Pb is maintained at zero.

At time T(8), if it is determined that the cooling water temperature of engine 2 has reached the predetermined value or higher and that warm-up is completed, HV-ECU 302 causes brake ECU 300 to control brake actuator 8 such that brake hydraulic pressure Ph increases to reach the predetermined hydraulic pressure Pb(0), and controls second MG 6 such that the output torque Tb of second MG 6 increases from zero to the reverse rotation direction. HV-ECU 302 causes brake ECU 300 to control brake actuator 8 such that after the brake hydraulic pressure Pb reaches the predetermined hydraulic pressure Pb(0), the brake hydraulic pressure Pb is maintained at the predetermined hydraulic pressure Pb(0).

At time T(9), after the brake hydraulic pressure Ph reaches the predetermined hydraulic pressure Pb(0), HV-ECU 302 maintains continuous increase of output torque Tb of second MG 6 in the reverse rotation direction, and controls first MG 4 such that the output torque Ta of first MG 4 increases in the reverse rotation direction. As the output torque Tb of second MG 6 is increased in the reverse rotation direction, the output torque Ta of first MG 4 is transmitted to the output shaft of engine 2. When the output torque Ta of first MG 4 is transmitted to the output shaft of engine 2, the output torque Ta of first MG 4 acts in the reverse rotation direction of engine 2 and, hence, rotation of the output shaft of engine 2 is prevented.

From time T(9) to T(10), HV-ECU 302 controls first MG 4 such that the output torque Ta of first MG 4 increases in the reverse rotation direction as the speed of engine 2 becomes slower, and controls second MG 6 such that the output torque Tb of second MG 6 increases in the reverse rotation direction.

From time T(10) to T(11), HV-ECU 302 controls first MG 4 such that output torque Ta of first MG 4 decreases to zero in the positive rotation direction as the speed of engine 2 becomes slower. Further, HV-ECU 302 controls second MG 6 such that output torque Tb of second MG 6 decreases to zero in the positive rotation direction.

At time T(11), HV-ECU 302 controls first MG 4 such that after engine 2 is stopped, output torque Ta of first MG 4 is maintained at zero, and controls second MG 6 such that output torque Tb of second MG 6 decreases to zero in the positive rotation direction. Then, HV-ECU 302 causes brake ECU 300 to control brake actuator 8 such that brake hydraulic pressure Pb decreases by a predetermined amount of change from the predetermined hydraulic pressure Pb(0).

At time T(12), HV-ECU 302 controls second MG 6 such that output torque Tb of second MG 6 is maintained at zero. Further, HV-ECU 302 causes brake ECU 300 to control brake actuator 8 such that brake hydraulic pressure Pb is maintained at zero.

At time T(13), the driver starts to press brake pedal 22 to enable an operation of cancelling the selection of P position and selecting the D position.

At time T(14), if the amount of operation of brake pedal 22 reaches a predetermined value or higher, selection of a shift position different from the P position is permitted. At this time, when the driver operates the shift lever to select the D position, selection of the P position is cancelled and the shift position is switched from the P position to the D position.

As described above, if the automatic start control and automatic stop control of engine 2 is executed while the vehicle is parked, increase/decrease of brake hydraulic pressure Pb for limiting movement of vehicle 40 is repeated every time engine 2 is automatically started and automatically stopped. As a result, the number of operations of brake actuator 8 may possibly be increased. If the number of operations of brake actuator 8 increases, the number of contacts between a valve element and the valve body increases when pressure reducing valve 154 and pressure intensifying valve 156 operate from the open state to the closed state. Therefore, a design ensuring durability against wear and the like becomes necessary and brake actuator 8 becomes larger, resulting in higher cost.

In view of the foregoing, the present embodiment is characterized in that, before the start of engine 2, if the shift position is the parking position and decrease in the amount of operation of brake pedal 22 is detected, brake ECU 300 realizes control to prevent decrease in brake hydraulic pressure Pb until the shift position is switched.

When an operation is done to switch the shift position from the P position to a shift position different from the P position, brake ECU 300 cancels the control for preventing decrease of brake hydraulic pressure Pb.

Figure 3:
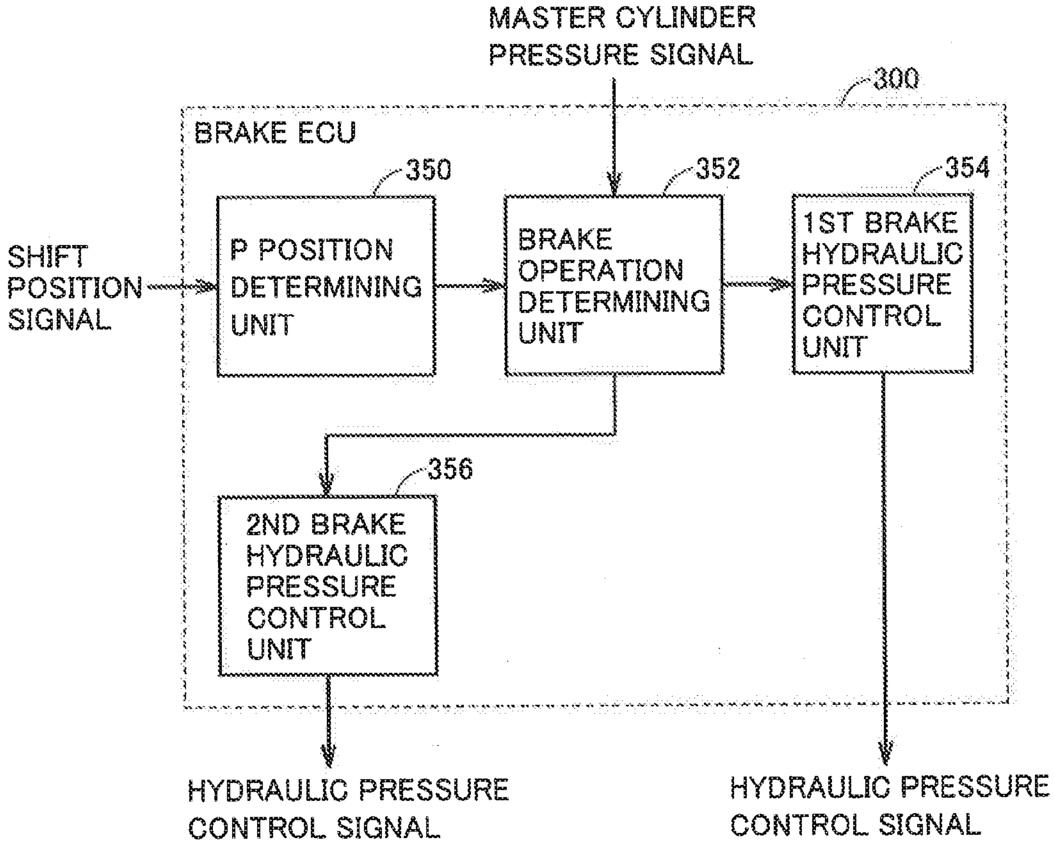
FIG. 3 is a functional block diagram of a brake ECU as a vehicle controller in accordance with the embodiment.

FIG. 3 is a functional block diagram of brake ECU 300 as the vehicle controller in accordance with the present embodiment. Brake ECU 300 includes a P position determining unit 350, a brake operation determining unit 352, a first brake hydraulic pressure control unit 354, and a second brake hydraulic pressure control unit 356.

P position determining unit 350 determines whether or not the shift position is the P position. P position determining unit 350 determines whether or not the shift position is the P position, based on a shift position signal received from HV-ECU 302. P position determining unit 350 may set a P position determination flag on, if the shift position is determined to be the P position.

Brake operation determining unit 352 determines whether or not the operation of brake pedal 22 is an operation releasing pressing of brake pedal 22. Specifically, brake operation determining unit 352 determines whether or not the amount of operation of brake pedal 22 is decreasing. By way of example, if the amount of operation of brake pedal 22 based on the pressure of master cylinder is changing to the side releasing the pressing of brake pedal 22 (for example, if the pressing side is positive, the time change in the amount of operation of brake pedal 22 has a negative value), brake operation determining unit 352 determines that the amount of operation of brake pedal 22 is decreasing.

Brake operation determining unit 352 may determine whether or not the amount of operation of brake pedal 22 is decreasing, on condition that the amount of operation of brake pedal 22 is at least a predetermined value. Further, by way of example, brake operation determining unit 352 may set a brake operation determination flag on, if the amount of operation of brake pedal 22 is determined to be decreasing.

If it is determined that the shift position is the P position and the amount of operation of brake pedal 22 is decreasing, first brake hydraulic pressure control unit 354 executes the first hydraulic pressure control. Specifically, if it is determined that the shift position is the P position and the amount of operation of brake pedal 22 is decreasing, first brake hydraulic pressure control unit 354 generates a first hydraulic pressure control signal to prevent decrease of brake hydraulic pressure Pb at the time point when the amount of operation of brake pedal 22 is determined to be decreasing and to maintain the brake hydraulic pressure Pb, regardless of the decrease of the amount of operation of brake pedal 22, and transmits the signal to brake actuator 8. For instance, first brake hydraulic pressure control unit 354 controls pressure reducing valve 154 and pressure intensifying valve 156 both to the closed state, to maintain the brake hydraulic pressure Pb.

It is noted that first brake hydraulic pressure control unit 354 may control brake actuator 8 to prevent decrease of brake hydraulic pressure Pb regardless of the decrease of the amount of operation of brake pedal 22, when the P position determination flag and the brake operation determination flag are both on.

If the shift position is not the P position, or if the amount of operation of brake pedal 22 is not determined to be decreasing, second brake hydraulic pressure control unit 356 executes a second hydraulic pressure control, which is a usual brake hydraulic pressure control. The usual brake hydraulic pressure control while vehicle 40 is parked is, for example, control for generating brake hydraulic pressure Pb in accordance with the amount of operation of brake pedal 22. Therefore, if the amount of operation of brake pedal 22 decreases, the brake hydraulic pressure Pb is also decreased, in accordance with the decrease of the amount of operation of brake pedal 22.

The usual brake hydraulic pressure control while vehicle 40 is running is coordinated control of hydraulic pressure braking and regenerative braking in accordance with the state of running of the vehicle.

In the present embodiment, P position determining unit 350, brake operation determining unit 352, first brake hydraulic pressure control unit 354, and second brake hydraulic pressure control unit 356 are described as software functions realized by a CPU of brake ECU 300 executing a program stored in a memory. These units, however, may be realized by hardware. The program is recorded on a recording medium and mounted on the vehicle.

Figure 4:
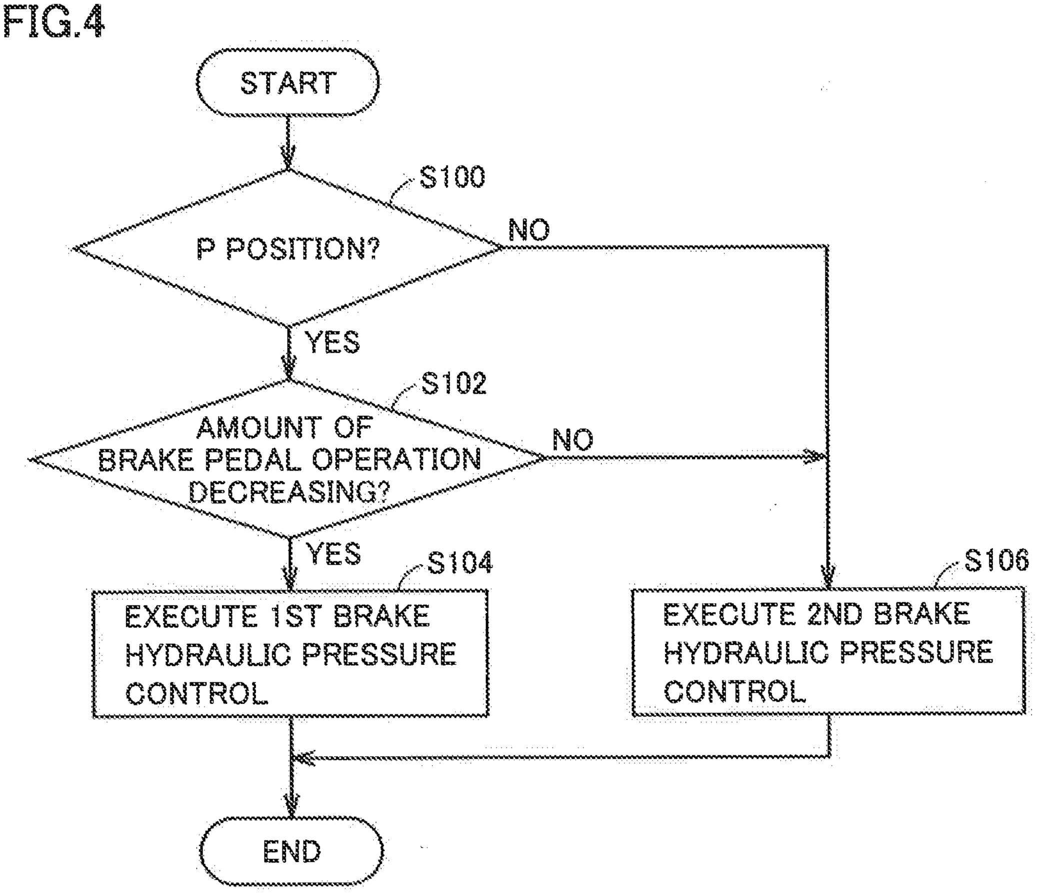
FIG. 4 is a flowchart representing a control structure of a program executed by the brake ECU as the vehicle controller in accordance with the embodiment.

Referring to FIG. 4, a control structure of the program executed by brake ECU 300 as the vehicle controller in accordance with the present embodiment will be described.

At step (hereinafter "step" will be denoted by "S") 100, brake ECU 300 determines whether or not the shift position is the P position. If the shift position is the P position (YES at S100), the process proceeds to S102. Otherwise (NO at S100), the process proceeds to S106.

At S102, brake ECU 300 determines whether or not the amount of operation of brake pedal 22 is decreasing. If the amount of operation of brake pedal 22 is decreasing (YES at S102), the process proceeds to S104. Otherwise (NO at S104), the process proceeds to S106.

At S104, brake ECU 300 executes the first brake hydraulic pressure control. At S106, ECU 300 executes the second brake hydraulic pressure control.

Figure 5:
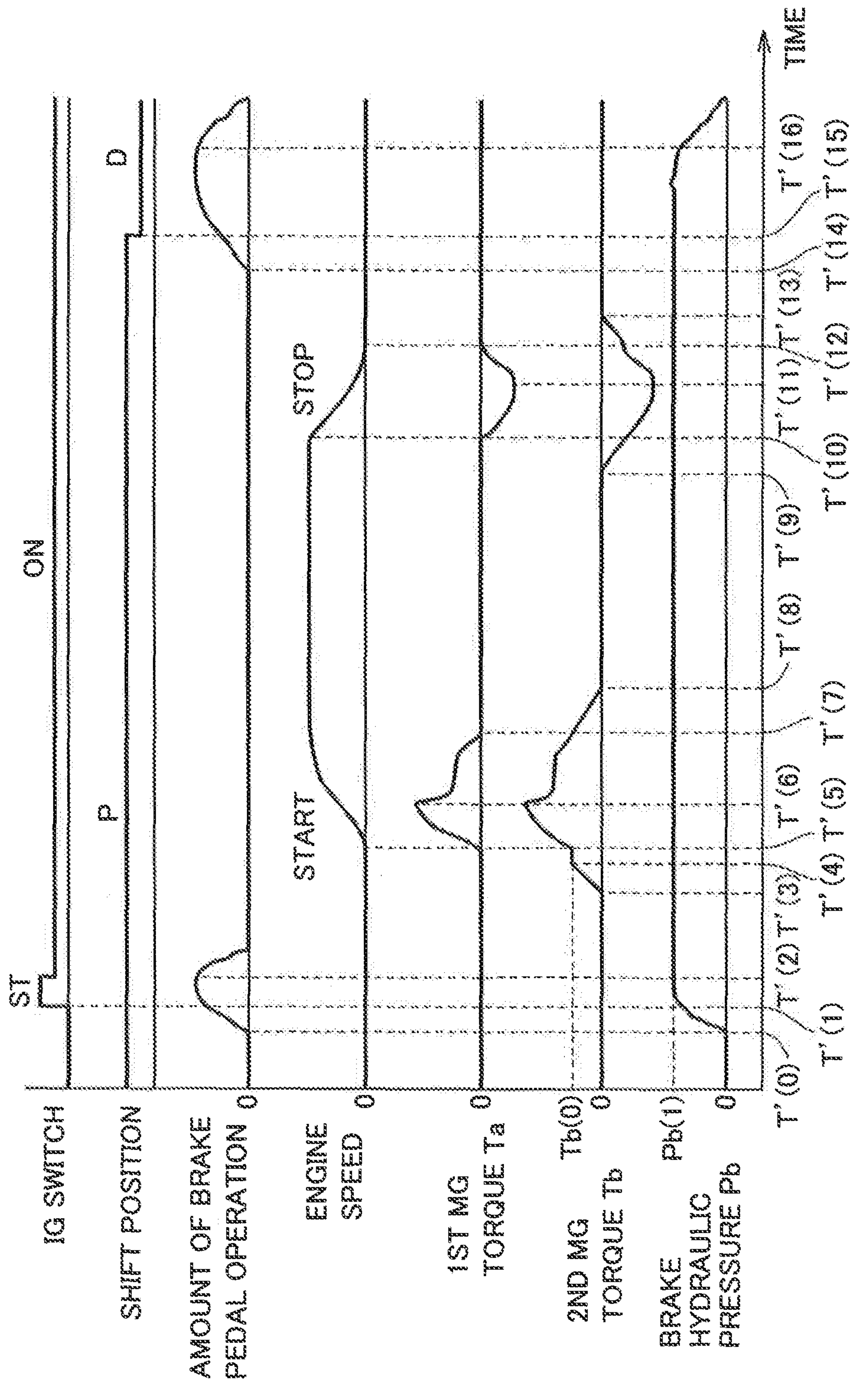
FIG. 5 is a (first) timing chart representing an operation of the brake FCU as the vehicle controller in accordance with the embodiment.

The operation of brake ECU 300 as the vehicle controller in accordance with the present embodiment, based on the structure and flowchart as above, will be described with reference to FIG. 5. FIG. 5 shows the state of IG switch 36, shift position, amount of operation of brake pedal 22, engine speed, output torque Ta of first MG 4, output torque Tb of second MG 6, and the change in brake hydraulic pressure Pb. It is assumed that the system of vehicle 40 is stopped, and the P position is selected as the shift position (YES at S100).

At time T(0), the driver starts pressing brake pedal 22 to activate the system of vehicle 40. After the amount of operation of brake pedal 22 reached a predetermined value, at time T(1), the driver carries out the ST operation of IG switch 36, whereby power source ECU 306 turns on the IG relay. Thus, power is supplied to electric equipment mounted on vehicle 40 and the system in vehicle 40 is activated. As the driver operates brake pedal 22 such that the amount of operation of brake pedal 22 exceeds a predetermined value, brake hydraulic pressure Pb attains to Pb(1).

At time T(2), when the driver starts releasing the pressing of brake pedal 22, the amount of operation of brake pedal 22 decreases (YES at S102). Therefore, brake ECU 300 executes the first hydraulic pressure control (S104). Therefore, the brake hydraulic pressure Pb(1) at the time point T(2) when the amount of operation of brake pedal 22 is determined to be decreasing, is maintained from time T'(2) to T'(15) when the shift position is switched from the P position to the D position.

At time T'(3), if the cooling water temperature of engine 2 is lower than the predetermined value and it is determined that warm-up is not yet completed, HV-ECU 302 controls the second MG 6 such that output torque Tb of second MG 6 increases in the positive rotation direction from zero to attain a predetermined torque Tb(0).

At time T'(4), HV-ECU 302 controls second MG 6 such that output torque Tb of second MG 6 attains to the predetermined torque Tb(0) and thereafter maintained at the predetermined torque Tb(0).

At time T(5), HV-ECU 302 increases the output torque Ta of first MG 4 in the positive rotation direction and increases the output torque Tb of second MG 6 in the positive rotation direction, whereby the output torque Ta of first MG 4 is transmitted to the output shaft of engine 2. As the output torque Ta of first MG 4 is transmitted to the output shaft of engine 2, the output shaft of engine 2 starts rotation. In addition to the operation of first MG 4, HV-ECU 302 causes engine ECU 304 to execute ignition control and fuel injection control of engine 2, whereby engine 2 is started.

At time T'(6), after it is determined that the speed of engine 2 has reached a predetermined speed or higher and hence engine 2 is started, HV-ECU 302 controls first MG 4 and second MG 6 such that the output torques Ta and Tb of first MG 4 and second MG 6 decrease to zero.

At time T(7), HV-ECU 302 controls first MG 4 such that the output torque Ta of first MG 4 is kept at zero. Further, HV-ECU 302 continuously controls second MG 6 such that the output torque Tb of second MG 6 decreases to zero.

At time T'(8), HV-ECU 302 controls second MG 6 such that the output torque Tb of second MG 6 is maintained at zero.

At time T(9), if it is determined that the cooling water temperature of engine 2 has reached the predetermined value or higher and that warm-up is completed, HV-ECU 302 controls second MG 6 such that the output torque Tb of second MG 6 increases from zero to the reverse rotation direction.

At time T'(10), HV-ECU 302 maintains continuous increase of output torque Tb of second MG 6 in the reverse rotation direction, and controls first MG 4 such that the output torque Ta of first MG 4 increases in the reverse rotation direction. As the output torque Tb of second MG 6 is increased in the reverse rotation direction, the output torque Ta of first MG 4 is transmitted to the output shaft of engine 2. When the output torque Ta of first MG 4 is transmitted to the output shaft of engine 2, the output torque Ta of first MG 4 acts in the reverse rotation direction of engine 2 and, hence, rotation of the output shaft of engine 2 is prevented.

From time T'(10) to T'(11), HV-ECU 302 controls first MG 4 such that the output torque Ta of first MG 4 increases in the reverse rotation direction as the speed of engine 2 becomes slower, and controls second MG 6 such that the output torque Tb of second MG 6 increases in the reverse rotation direction.

From time T'(11) to T'(12), HV-ECU 302 controls first MG 4 such that output torque Ta of first MG 4 decreases to zero in the positive rotation direction as the speed of engine 2 becomes slower. Further, HV-ECU 302 controls second MG 6 such that output torque Tb of second MG 6 decreases to zero in the positive rotation direction.

At time T(12), HV-ECU 302 control first MG 4 such that after engine 2 is stopped, output torque Ta of first MG 4 is maintained at zero, and controls second MG 6 such that output torque Tb of second MG 6 decreases to zero in the positive rotation direction.

At time T'(13), HV-ECU 302 controls second MG 6 such that output torque Tb is maintained at zero.

At time T'(14), the driver starts to press brake pedal 22 to enable an operation of cancelling the selection of P position and selecting the D position.

At time T'(15), if the amount of operation of brake pedal 22 reaches a predetermined value or higher, selection of a shift position different from the P position is permitted. At this time, when the driver operates the shift lever to select the D position, selection of the P position is cancelled and the shift position is switched from the P position to the D position (NO at S100).

Thus, brake ECU 300 executes the second hydraulic pressure control (S106), and brake hydraulic pressure Pb is decreased in accordance with the decrease of the amount of operation of brake pedal 22.

In the present embodiment, it is assumed that the system of vehicle 40 is stopped and the P position is selected as the shift position, and description is given that when the system of vehicle 40 is to be activated and brake pedal 22 is operated to activate the system of vehicle 40, decrease of brake hydraulic pressure is prevented regardless of the decrease in the amount of operation of brake pedal 22, from the time point when the amount of operation of brake pedal 22 is determined to be decreasing as the start point until a shift position different from the P position is selected. The control, however, is not specifically limited to the time of activating the system of vehicle 40.

Figure 6:
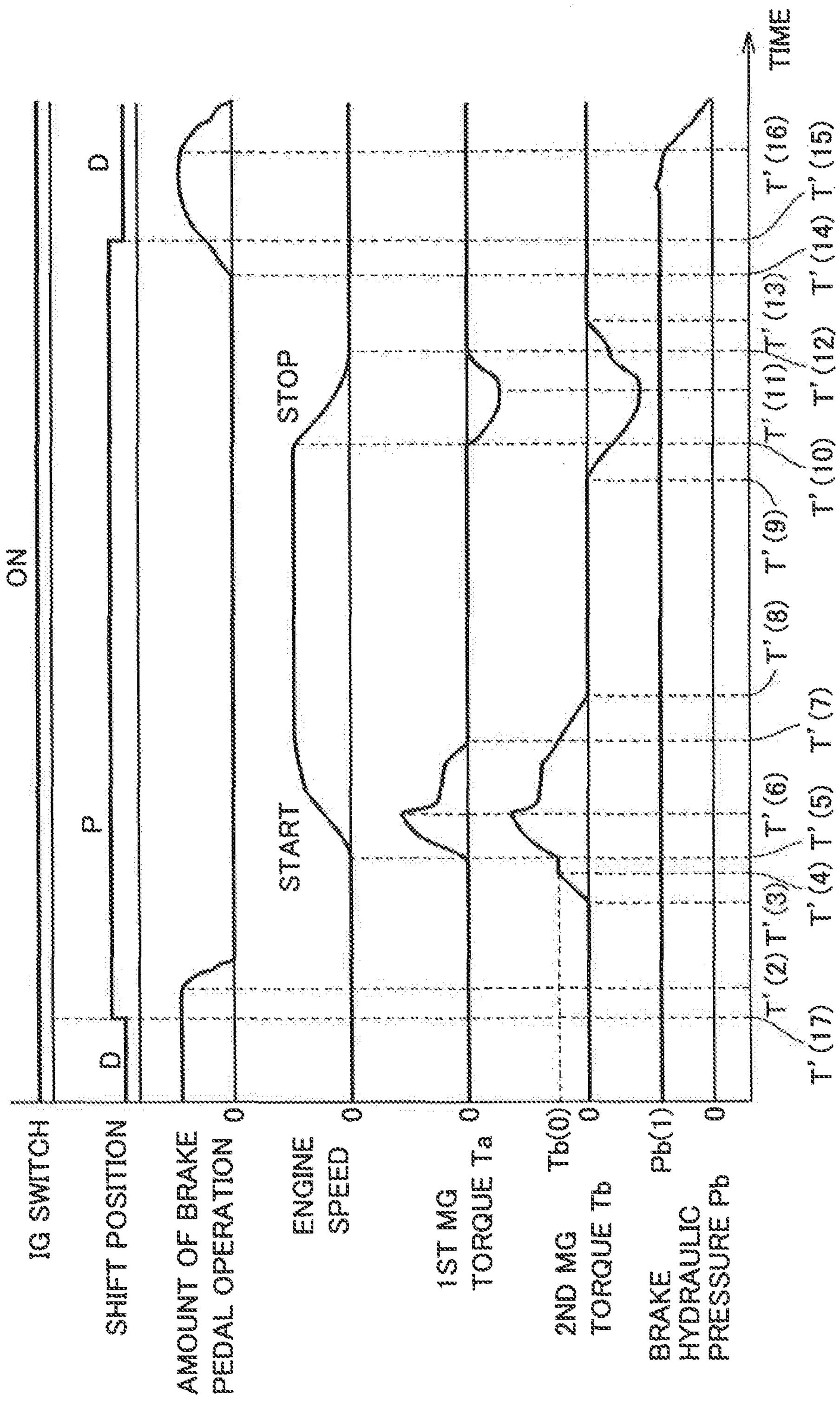
FIG. 6 is a (second) timing chart representing an operation of the brake ECU as the vehicle controller in accordance with the embodiment.

By way of example, assume that the system of vehicle 40 is active (IG switch 36 is on) as shown in FIG. 6. The D position is selected as the shift position, and brake pedal 22 is pressed (brake hydraulic pressure Pb is Pb(1)). Here, at time T'(17), if the shift position is switched from the D position to the P position (YES at S100), from the time point when the amount of operation of brake pedal is determined to be decreasing as the start point (YES at S102), decrease of brake hydraulic pressure is prevented regardless of the decrease in the amount of operation of brake pedal 22 until the shift position different from the P position is selected (S104). The operation of vehicle 40 from T'(2) to T'(16) after T'(17) in FIG. 6 is the same as that from T'(2) to T'(16) of FIG. 5 and, therefore, detailed description thereof will not be repeated.

As described above, according to the vehicle controller in accordance with the present embodiment, if the shift position is the P position and the amount of operation of brake pedal is determined to be decreasing, the decrease in brake hydraulic pressure is prevented, whereby the brake hydraulic pressure is maintained until a shift position different from the P position is selected. Therefore, even when the engine is automatically started and stopped while the vehicle is parked, increase in the number of operations of brake actuator can be prevented, while generation of gear noise (such as gear noise generated between the parking lock gear and the parking lock pole) caused by the engine start reaction force (reaction force against the rotation of first MG at the time of cranking or reaction force caused by the torque fluctuation at the first combustion of engine) is reduced. Therefore, a vehicle controller and a method of vehicle control that can prevent increase in the number of operations of brake actuator when the internal combustion engine is automatically started or stopped can be provided.

Further, when the shift position is switched from the P position to a position different from the P position, maintenance of brake hydraulic pressure is cancelled. Therefore, if the D position is selected as the shift position, for example, smooth and quick start of the vehicle is possible.

Though vehicle 40 has been described as a hybrid vehicle, it is not limiting. The vehicle may have only the engine as a driving source, or the vehicle may have only a motor as a driving source.

In such a vehicle, if the shift position is the P position and the operation of the brake pedal is determined to be an operation of cancelling the pressing of brake pedal and the decrease in brake hydraulic pressure is prevented until the shift position is switched from the P position to a position different from the P position, then it becomes unnecessary to execute the control to increase/decreases the brake hydraulic pressure while the vehicle is parked with the P position selected. Therefore, increase in the number of operations of the actuator can be reduced than when the control of increasing/decreasing the brake hydraulic pressure is executed while the vehicle is parked with the P position selected.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST

2 engine, 4, 6 MG, 8 brake actuator, 10 brake, 12 driving wheel, 14 reduction gear, 16 inverter, 18 power storage device, 20 master cylinder, 22 brake pedal, 30 master cylinder pressure sensor, 32 shift position sensor, 34 engine speed sensor, 36 IG switch, 38 brake hydraulic pressure sensor, 40 vehicle. 100 power split device, 102, 202 ring gear, 104, 204 pinion gear, 106, 206 carrier, 108, 208 sun gear, 150 accumulator, 152 pump motor, 154 pressure reducing valve, 156 pressure intensifying valve, 160 brake caliper, 162 brake disk, 164 drive shaft, 200 transmission, 250 parking lock mechanism, 252 parking lock gear, 254 parking lock pole, 256 parking lock actuator, 300 brake ECU, 302 HV-ECU, 304 engine ECU, 306 power source ECU, 310 communication bus, 350 P position determining unit, 352 brake operation determining unit, 354 first brake hydraulic pressure control unit, 356 second brake hydraulic pressure control unit.

The invention claimed is:

1. A vehicle controller mounted on a vehicle including an engine, a brake pedal, and a brake for limiting rotation of a wheel by supplying hydraulic pressure in accordance with an operation of said brake pedal, comprising:

a detecting unit for detecting an amount of operation of said brake pedal; and a control unit performing control such that before said engine starts, when the shift position is at a parking position and decrease in an amount of operation of said brake pedal is detected, hydraulic pressure supplied to said brake is maintained at hydraulic pressure corresponding to the amount of operation of said brake pedal at a time point when said decrease in the amount of operation of said brake pedal has been detected until said shift position is switched, wherein, before said engine starts, when said shift position is at said parking position and decrease in the amount of operation of said brake pedal is detected after said hydraulic pressure supplied to said brake is increased in response to increase in the amount of operation of said brake pedal, said hydraulic pressure supplied to said brake is maintained at hydraulic pressure corresponding to the amount of operation of said brake pedal at a time point when said decrease in the amount of operation of said brake pedal has been detected until said shift position is switched.

2. The vehicle controller according to claim 1, further comprising an engine control unit for automatically starting said engine when prescribed engine start conditions are satisfied based on a state of said vehicle.

3. The vehicle controller according to claim 1, wherein said control unit cancels prevention of decrease of hydraulic pressure supplied to said brake, when an operation is done to switch said shift position from said parking position to a shift position different from said parking position.

4. The vehicle controller according to claim 1, wherein said vehicle further includes a first rotating electrical machine for starting said engine and a second rotating electrical machine for generating driving force of said wheel, said engine, said first rotating electrical machine and said second rotating electrical machine being coupled through a planetary gear mechanism including a sun gear, a carrier and a ring gear;

said vehicle controller further comprising a rotating electrical machine control unit for controlling said second rotating electrical machine such that when said engine is to be started by using said first rotating electrical machine, a reaction force for transmitting rotation force of said first rotating electrical machine to said engine is generated.

5. A vehicle control method, for controlling a vehicle including an engine, a brake pedal, and a brake for limiting rotation of a wheel by supplying hydraulic pressure in accordance with an operation of said brake pedal, comprising the steps of:

detecting an amount of operation of said brake pedal; and performing control such that before said engine starts, when the shift position is at a parking position and decrease in an amount of operation of said brake pedal is detected, hydraulic pressure supplied to said brake is maintained at hydraulic pressure corresponding to the amount of operation of said brake pedal at a time point when said decrease in the amount of operation of said brake pedal has been detected until said shift position is switched, wherein, before said engine starts, when said shift position is at said parking position and decrease in the amount of operation of said brake pedal is detected after said hydraulic pressure supplied to said brake is increased in response to increase in the amount of operation of said brake pedal, said hydraulic pressure supplied to said brake is maintained at hydraulic pressure corresponding to the amount of operation of said brake pedal at a time point when said decrease in the amount of operation of said brake pedal has been detected until said shift position is switched.

* * * * *